(12) United States Patent
Dudra et al.

(10) Patent No.: US 8,425,270 B2
(45) Date of Patent: Apr. 23, 2013

(54) LENGTH-ADJUSTABLE TIE BAR FOR MARINE ENGINES

(75) Inventors: Brian James Dudra, Vancouver (CA); Richard Tyler Redfern, Delta (CA); Noam Dean Davidson, Vancouver (CA)

(73) Assignee: Marine Canada Acquisition Inc., Richmond (CA)

( * ) Notice: Subject to any disclaimer, the term of this patent is extended or adjusted under 35 U.S.C. 154(b) by 0 days.

(21) Appl. No.: 13/008,683

(22) Filed: Jan. 18, 2011

(65) Prior Publication Data

US 2012/0184160 A1 Jul. 19, 2012

(51) Int. Cl.
*B63H 20/08* (2006.01)
*B63H 5/125* (2006.01)

(52) U.S. Cl.
USPC .............................................. 440/53; 440/63

(58) Field of Classification Search ............ 440/53, 440/63, 32; 74/422, 425, 498, 509, 469, 74/479.01, 480 R, 480 B; 180/428; 280/93.511, 280/93.514; 411/389
See application file for complete search history.

(56) References Cited

U.S. PATENT DOCUMENTS

| | | | |
|---|---|---|---|
| 3,756,186 A * | 9/1973 | Nordling | 440/63 |
| 4,009,678 A | 3/1977 | North | |
| 4,057,985 A * | 11/1977 | Stahl | 70/231 |
| 4,311,471 A | 1/1982 | Queen | |
| 4,710,141 A | 12/1987 | Ferguson | |
| 6,406,340 B1 * | 6/2002 | Fetchko et al. | 440/61 R |
| 6,561,860 B2 * | 5/2003 | Colyvas | 440/63 |
| 6,699,082 B2 * | 3/2004 | Zeiger | 440/63 |
| 6,913,497 B1 * | 7/2005 | Ahlswede et al. | 440/63 |
| 7,128,626 B2 | 10/2006 | Dudra et al. | |
| 7,128,627 B2 | 10/2006 | Ferguson | |
| 7,156,708 B2 | 1/2007 | Dudra | |
| 7,207,854 B1 * | 4/2007 | Anderson et al. | 440/63 |
| 2002/0086594 A1 | 7/2002 | Colyvas | |
| 2004/0005824 A1 | 1/2004 | Zeiger | |

\* cited by examiner

*Primary Examiner* — Daniel Venne
*Assistant Examiner* — Anthony Wiest
(74) *Attorney, Agent, or Firm* — Cameron IP (57) ABSTRACT

The present invention relates to a tie bar. The tie bar has a first subassembly and a second subassembly. The first subassembly includes an end portion configured to connect to a propulsion unit, a first tube that extends from the end portion and a threaded member operatively connected to the end portion and disposed within and at least partially extending along the first tube. The second subassembly includes an end portion configured to connect to a further propulsion unit and a second tube that extends from the end portion of the second subassembly. The second subassembly is configured to threadably engage with the threaded member. The distance of separation between the end portions is selectively adjustable thereby.

19 Claims, 11 Drawing Sheets

LENGTH-ADJUSTABLE TIE BAR FOR MARINE ENGINES

FIELD OF THE INVENTION

The present invention relates to tie bars. In particular, the invention relates to a length-adjustable tie bar for marine engines.

DESCRIPTION OF THE RELATED ART

Conventional tie bars provide structures that result in threading adjustment mechanisms which are relatively exposed to the environment, including water, debris and the like. This can lead to the premature failure of the tie bars through corrosion and/or wear and tear, particularly in salt water conditions.

This problem may be compounded by the relatively demanding and varied forces to which tie bars may be subjected.

BRIEF SUMMARY OF INVENTION

The some embodiments in accordance with the present invention provide a tie bar that may overcome some of the above mentioned disadvantages.

In one embodiment, a tie bar having a first subassembly and a second subassembly is provided. The first subassembly includes an end portion configured to connect to a propulsion unit, a first tube that extends from the end portion and a threaded member operatively connected to the end portion and disposed within and at least partially extending along the first tube. The second subassembly includes an end portion configured to connect to a further propulsion unit and a second tube that extends from the end portion of the second subassembly. The second subassembly is configured to threadably engage with the threaded member. The distance of separation between the end portions is selectively adjustable thereby.

In another embodiment there may be provided a tie bar having a pair of spaced-apart end portion configured to connect to a pair of propulsion units. The tie bar has a pair of telescoping tubes operatively connected to and extending from the pair of end portions. A threaded member is fully disposed within the tubes. The threaded member is fixedly connected to one of the tubes near a first end and operatively threadably engages the other of the tubes near a second end spaced-apart from the first end.

In other embodiments there may be provided the above described tie bars in combination with propulsion units.

BRIEF DESCRIPTION OF DRAWINGS

Certain example embodiments in accordance with the invention will be more readily understood from the following description with reference to the accompanying drawings, in which.

DESCRIPTION OF THE PREFERRED EMBODIMENTS

Figure 1:
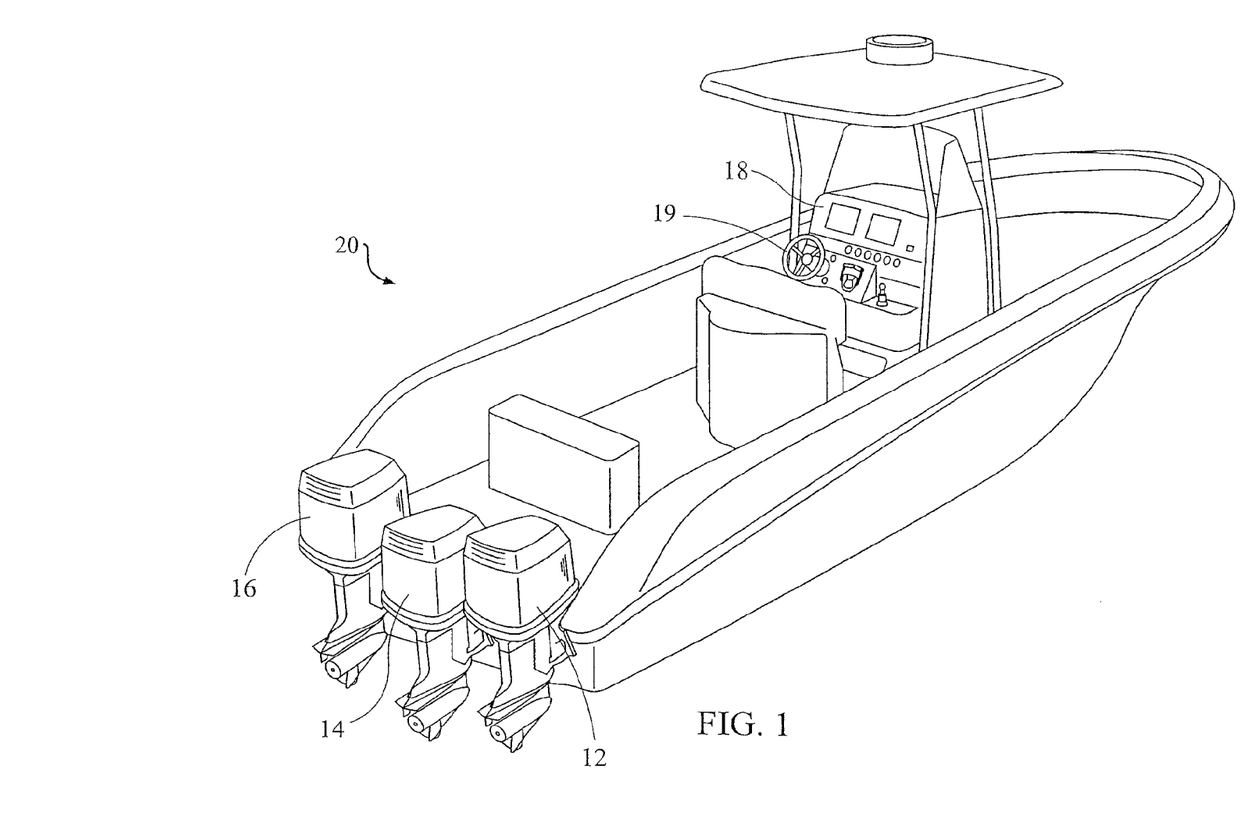
FIG. 1 is a top, rear perspective view of a marine vessel provided with a plurality of propulsion units and an improved steering assembly.

Referring to the drawings and first to FIG. 1, this shows a marine vessel 20 which is provided with a plurality of propulsion units in the form of three outboard engines 12, 14 and 16. However, in the other examples, the marine vessel 20 may be provided with any suitable number of inboard and/or outboard engines. It is common to see two engines and up to four engines in pleasure marine vessels. The marine vessel 20 is also provided with helm station 18 that includes a steering wheel 19 for steering the marine vessel 20. The steering wheel 19 is operatively connected to a hydraulic pump (not shown) and is part of a hydraulic steering assembly which is used to steer the marine vessel.

Figure 2:
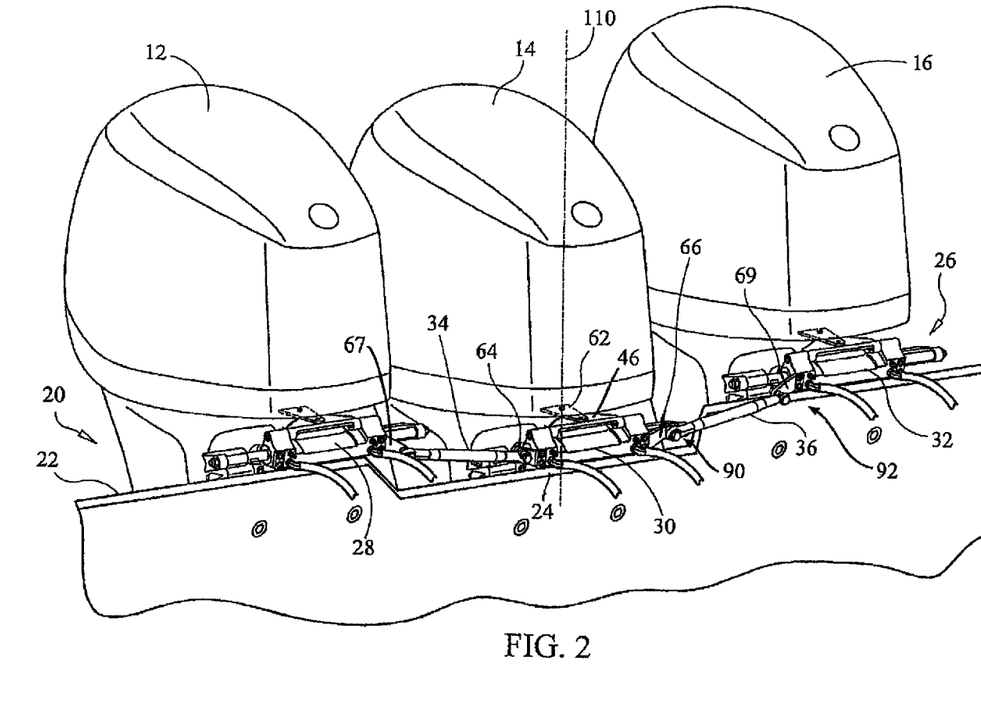
FIG. 2 is a top, front perspective view of the propulsion units and improved steering assembly, which includes tie bars.

As best shown in FIG. 2, the engines 12, 14 and 16 are mounted on a transom 22 of the marine vessel 20, which is shown in fragment. The center engine 14 is mounted inside a centrally disposed, recessed portion 24 of the transom 22. Other embodiments may incorporate a transom that is not recessed. The starboard and port side engines 12 and 16 are mounted on opposite sides of the transom 22 outside the recessed portion 24. The center engine 14 is accordingly vertically offset with respect to the starboard and port side engines 12 and 16. A steering assembly, indicated generally by reference numeral 26, mechanically couples the engines. This allows the engines to be steered simultaneously. The steering assembly 26, better shown in FIG. 3, includes a plurality of steering actuators 28, 30 and 32 together with members, in this example tie bars 34 and 36 which connect adjacent steering actuators. The steering actuators have a substantially similar structure and function in a substantially similar manner.

Figure 3:
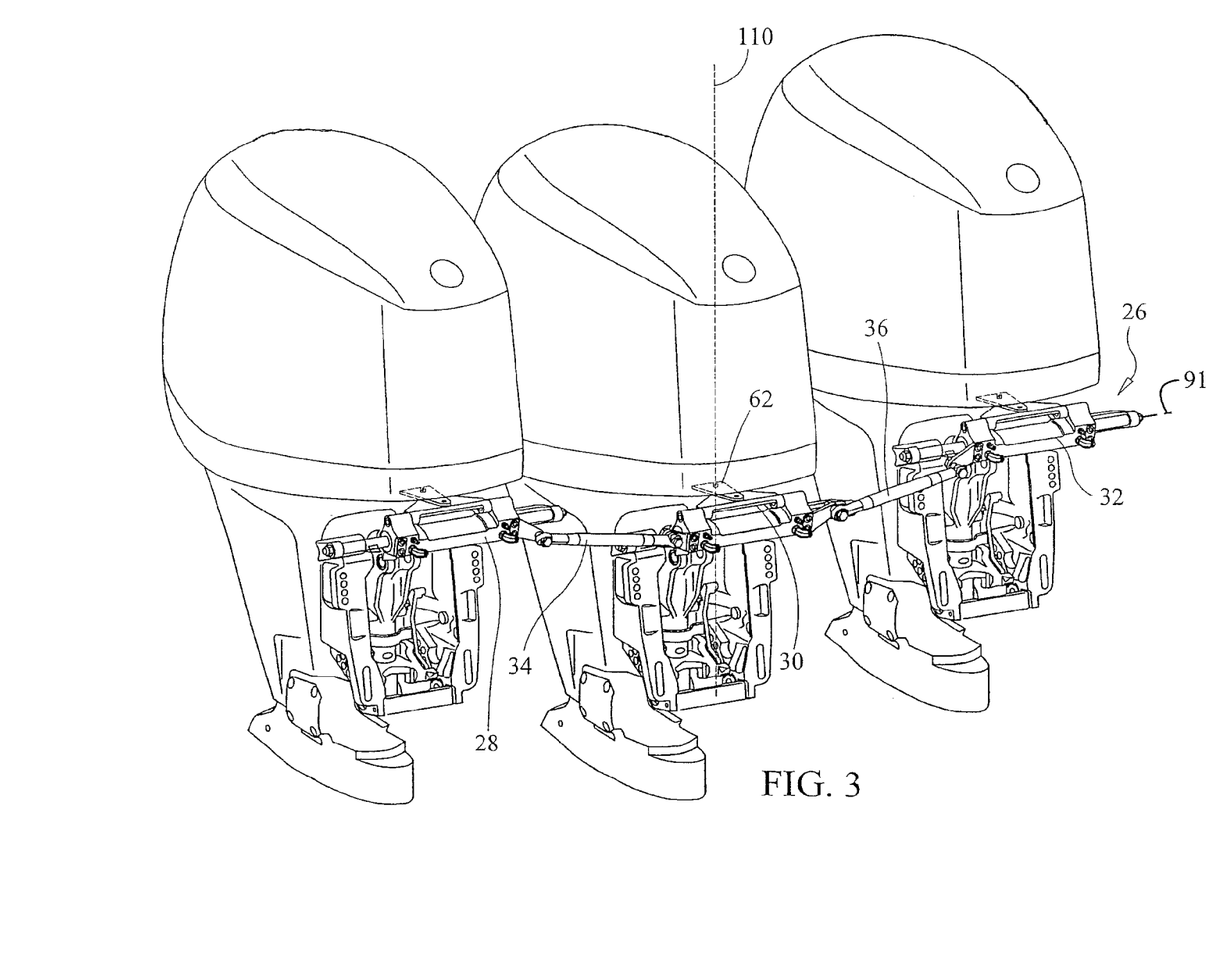
FIG. 3 is another perspective view of the improved steering assembly and propulsion units.
Figure 4:
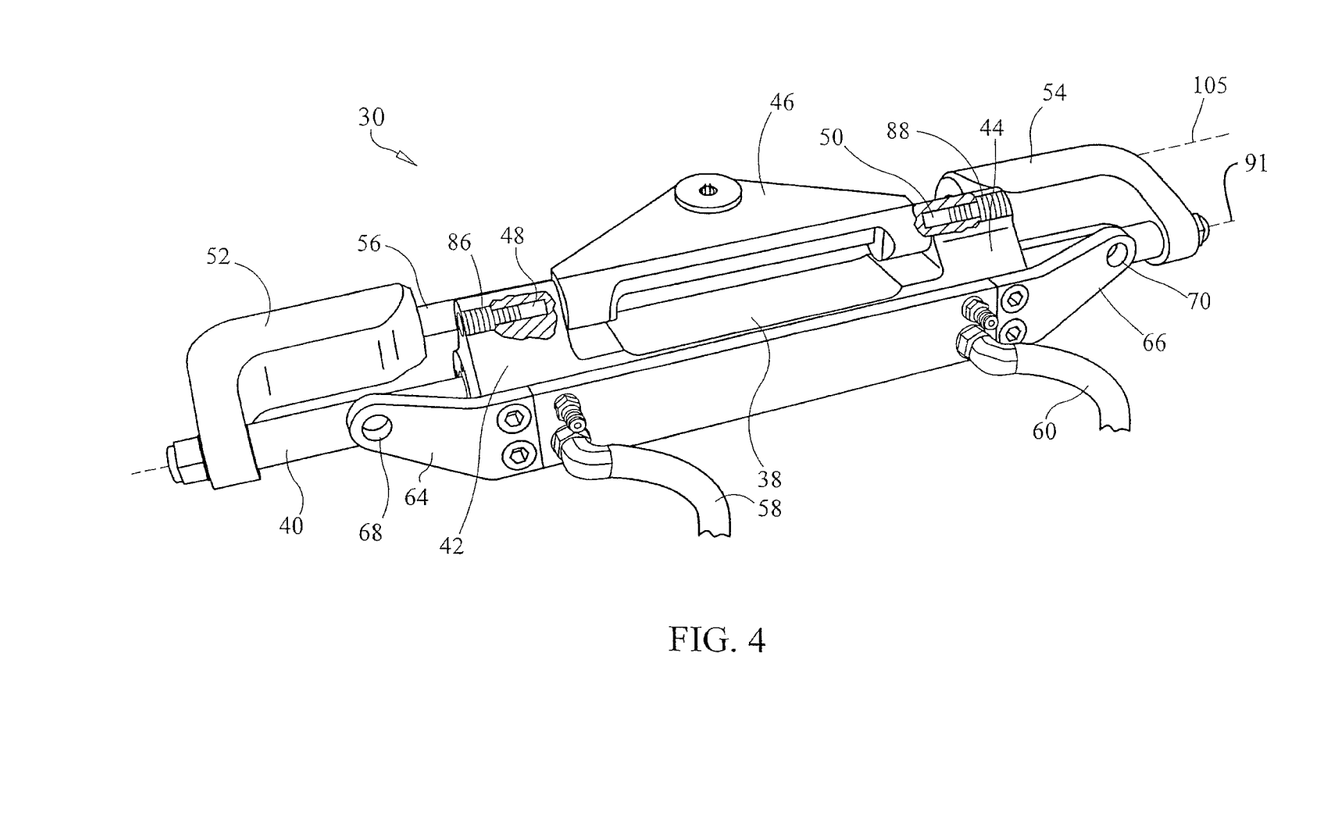
FIG. 4 is a perspective, partially broken away, view of a middle hydraulic steering actuator of the improved steering assembly.

FIG. 4 shows the middle steering actuator 30 in greater detail. The middle steering actuator 30 includes a hydraulic cylinder 38 with a piston rod 40 reciprocatingly mounted therein allowing for relative movement of the cylinder 38 along a piston rod axis 91. The cylinder has a pair of spaced-apart cylinder arms 42 and 44 which extend radially outward of the cylinder 38. A pivot plate 46 is pivotably connected to each of the cylinder arms 42 and 44 by pivot pins 48 and 50, respectively. A pair set screws 86 and 88 exert a compression force against the pivot pins 48 and 50 to maintain the pivot pins in position. The pivot plate 46 extends between the cylinder arms 42 and 44 and the cylinder arms may pivot about the pivot plate. Support arms 52 and 54 connect opposite ends of the piston rod 40 to a tilt rod 56 of a tilt tube (not shown) of the middle engine 14 which is shown in FIGS. 1 to 3. The support arms 52 and 54 restrict axial movement of the piston rod 40 relative to the marine vessel 20. The support arms 52 and 54 also allow arcuate movement of the cylinder 38 and piston rod 40, about a tilt axis 105, while maintaining the piston rod axis 91 parallel to the tilt axis 105.

Hydraulic conduits 58 and 60 hydraulically connect opposite ends of the cylinder 38 to the helm pump (not shown). Hydraulic fluid pumped from the helm pump actuates the cylinder 38 to reciprocate linearly relative to the piston rod 40 as is well known in the art. In particular, the piston rod 40 remains axially stationary relative to the marine vessel 20, shown in FIG. 1, while the cylinder 38 reciprocates relative to the marine vessel 20.

Referring to FIG. 2, a steering member in the form of tiller 62 of the middle engine 14 is pivotably connected to the pivot plate 46 of the middle steering actuator 30. The relative linear movement of the cylinder 38 is thus transmitted to the tiller 62. This causes the tiller 62 to pivot about a steering axis 110 and the middle engine 14 to be steered. The starboard and port engines 12 and 16 are steered in a similar manner by the starboard and port side steering actuators 28 and 32. Furthermore, movement by any one of the steering actuators is transmitted by the tie bars 34 and 36 to the other ones of the steering actuators, allowing the engines to be steered simultaneously. As thus far described the steering assembly 26 and steering actuators 28, 30 and 32 are conventional.

However, as shown in FIG. 4, the middle steering actuator 30 is provided with asymmetrical tie bar mounts 64 and 66. The tie bar mounts 64 and 66 are each provided with an aperture 68 and 70, respectively. The apertures 68 and 70 extend axially in a direction generally perpendicular to the piston rod axis 91. Referring to FIG. 2, actuator 28 has a tie bar mount 67 and actuator 32 has a tie bar mount 69. The tie bar mounts 64, 66, 67 and 69 are substantially identical and one of the tie bar mounts 66 is shown in greater detail in FIG. 5. The tie bar mount 66 includes a first portion 72 and a second portion 74 which extends angularly from the first portion in an upwardly direction relative to the piston rod axis 91. In this example, the first portion 72 of the tie bar mount 66 has a generally quadrilateral shape and the second portion 74 of the tie bar mount 66 has a generally asymmetrical, semi-elliptical shape. Broken line 115 represents the divide between the first portion 72 of the tie bar mount 66 and the second portion 74 of the tie bar mount 66.

Connecting members in the form of bolts 76 secure the tie bar mount 66 to the cylinder 38 of the middle steering actuator 30. The bolts 76 extend in a direction generally perpendicular to the piston rod axis 91 and may engage a groove 78 in an end gland 80 of the cylinder 38. The bolts 76 maintain the gland 80 in position and prevent the gland 80 from becoming decoupled from the cylinder 38 in response to frictional and vibratory forces during operation of the hydraulic steering assembly.

A connecting member in the form of bolt 82 extends through the aperture 70 in the tie bar mount 66 and a ball joint 84 in the tie bar 36. The bolt 82 connects the tie bar mount 66 to the tie bar 36, allowing the middle steering actuator 30 to be connected to the port side actuator 32 as shown in FIG. 2. The bolt 82 extends in a direction generally perpendicular to the piston rod axis 91 and allows the tie bar 36 to be connected to the tie bar mount 66 on a vertical plane so as to permit pivoting of the tie bar 36 about a generally horizontal axis 111 along the bolt 82. The ball joint 84 provides an articulate connection between the tie bar mount 66 and the tie bar 36. The articulate connection allows the tie bar 36 to reciprocate along its longitudinal axis when the engines 12, 14 and 16 are moved back and forth as the marine vessel is steered. The middle steering actuator 30 is connected to the starboard side actuator 28 in a similar manner by tie bar mount 64 and tie bar 34. Ball joints are provided by way of example only and other types of joint connectors such as, for example, a universal joint, a double pin member or a double pinned joint similar to that shown in FIG. 15 and discussed further below.

A connecting member in the form of bolt 82 extends through the aperture 70 in the tie bar mount 66 and a ball joint 84 in the tie bar 36. The bolt 82 connects the tie bar mount 66 to the tie bar 36, allowing the middle steering actuator 30 to be connected to the port side actuator 32 as shown in FIG. 2. The bolt 82 extends in a direction generally perpendicular to the piston rod axis 91 and allows the tie bar 36 to be connected to the tie bar mount 66 on a vertical plane so as to permit pivoting of the tie bar 36 about a generally horizontal axis 111 along the bolt 82. The ball joint 84 provides an articulate connection between the tie bar mount 66 and the tie bar 36. The articulate connection allows the tie bar 36 to reciprocate along its longitudinal axis when the engines 12, 14 and 16 are moved back and forth as the marine vessel is steered. The middle steering actuator 30 is connected to the starboard side actuator 28 in a similar manner by tie bar mount 64 and tie bar 34. Ball joints are provided by way of example only and other types of joint connectors such as, for example, a universal joint, a double pin member or a double pinned joint similar to that shown in FIG. 15 and discussed further below.

Figure 6:
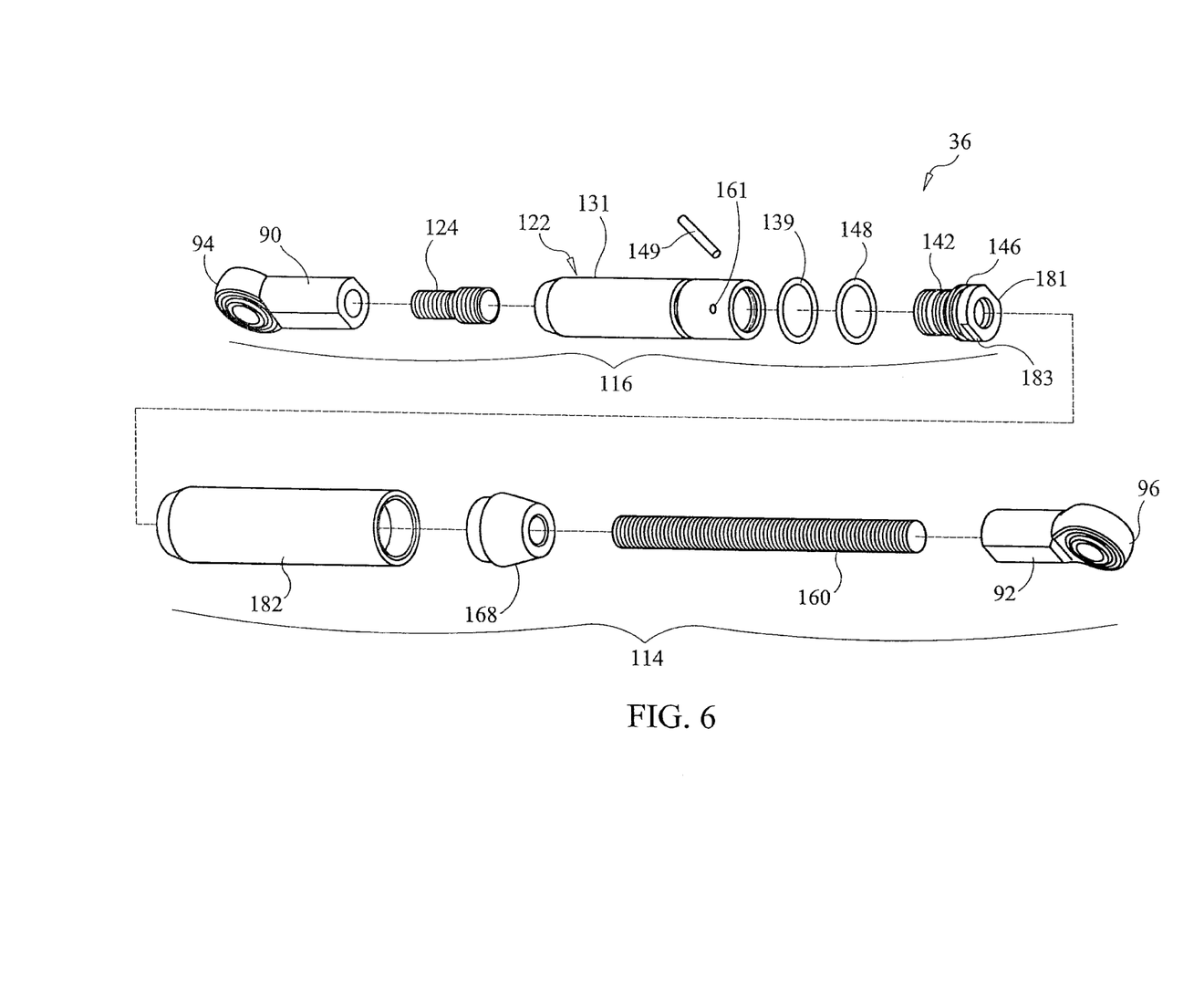
FIG. 6 is an exploded, isometric view of one of the tie bars shown in FIG. 2.
Figure 7:
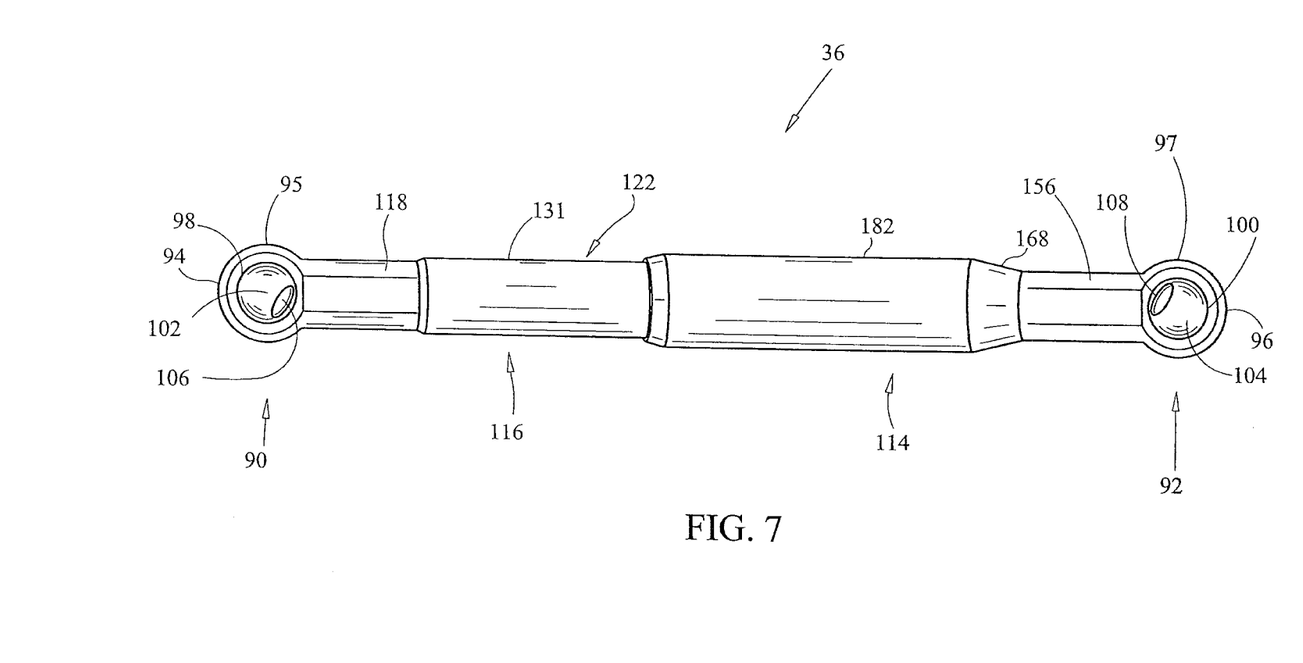
FIG. 7 is a side elevation view of the tie bar shown in FIG. 6 shown fully assembled, the tie bar being shown in an extended position.

FIGS. 6 to 14 show the tie bars in this example tie bar 36 in greater detail. FIG. 6 is an exploded view of the tie bar 36 showing its various components and FIG. 7 shows the tie bar in assembled form.

As best shown in FIG. 6, tie bar 36 includes a first subassembly 114 and a second subassembly 116. The first subassembly 114 includes end portion 92, a first threaded member in this example a threaded rod 160, a jam nut 168 and a first tube in this example an outer tube 182.

Figure 5:
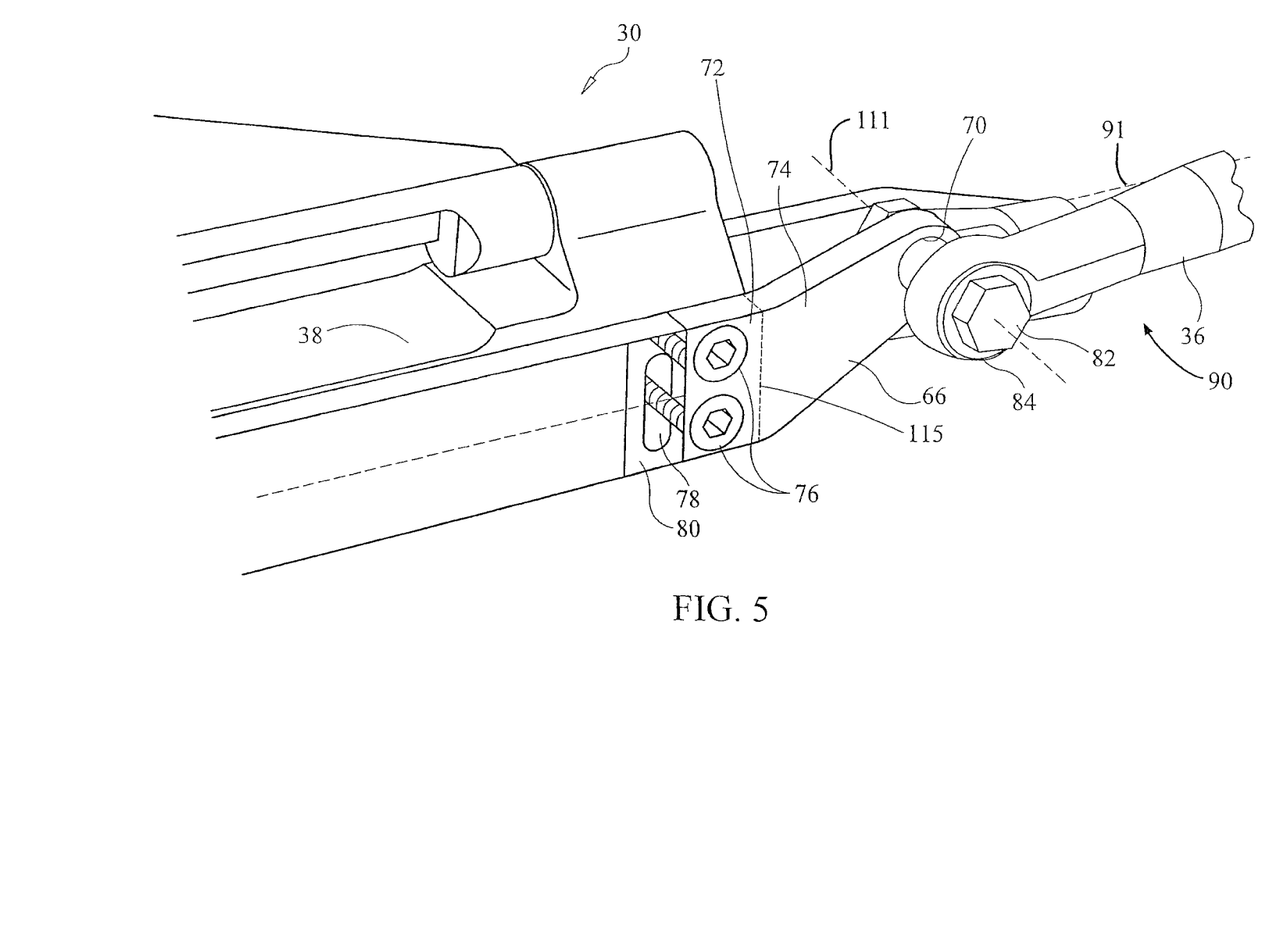
FIG. 5 is a fragmentary, partially broken away, view of the middle actuator of the improved steering assembly.
Figure 8:
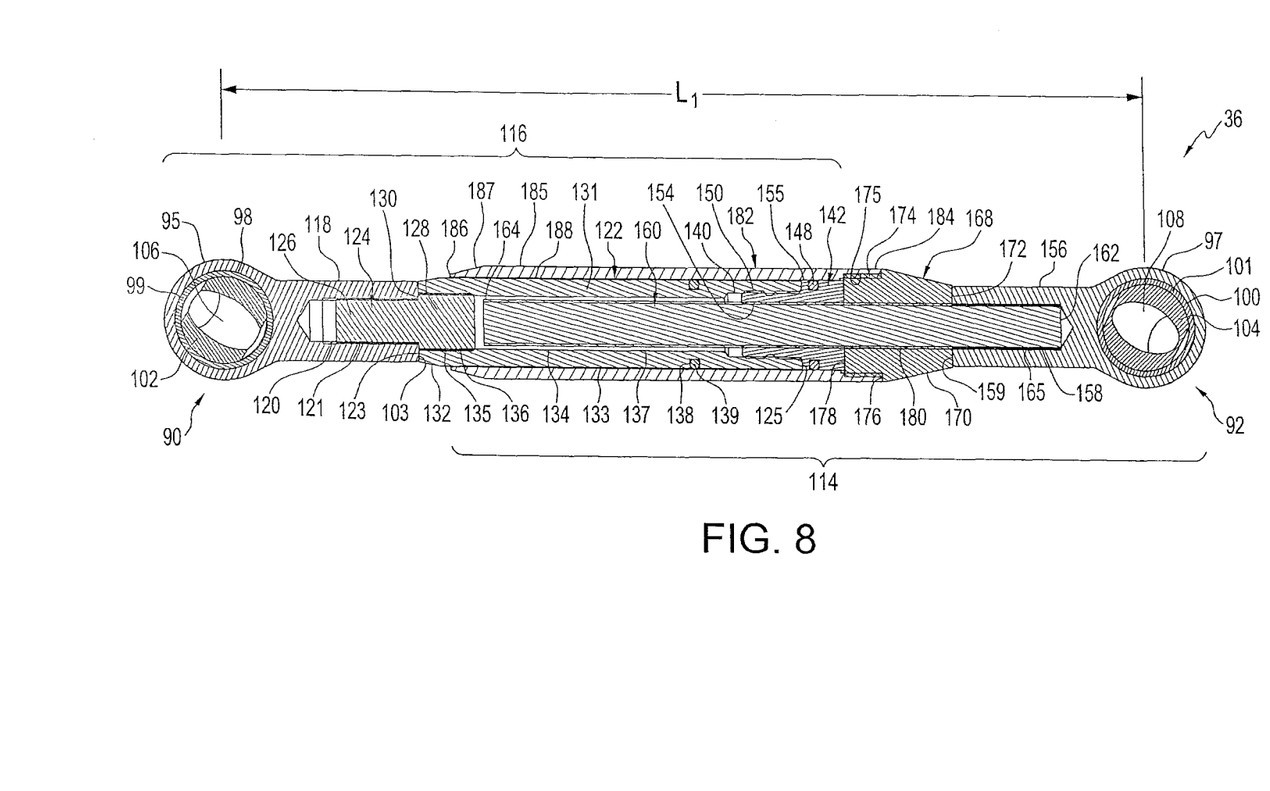
FIG. 8 is a side elevation, sectional view of the tie bar shown in FIG. 7 with the tie bar being in a fully retracted position.

As shown in FIG. 8, end portion 92 includes a circular protrusion portion 96 which has a spherical-like recess 100 within which ball 104 is disposed. Ball 104 is pivotally rotatable within recess 100 through the aid of bushing 101, which is interposed between ball 104 and recess 100. Ball 104 has a recess 108 shaped to receive a bolt (not shown). In a like manner as shown in FIGS. 2 and 5, end portion 92 is in articulated connection with the tie bar mount 69 and thus the steering apparatus 32. As shown in FIG. 8, end portion 92 has an elongate portion 156 connected to and extending from circular protrusion portion 96 towards an end 159 of the elongate portion 156, and a threaded bore 158 extending from end 159 to the right.

Threaded rod 160 has a first end 162 that is fixedly connected to the end portion 92, in this example by being threadably received within threaded bore 158 of end portion 92. This connection is achieved by applying torque to one or both of the threaded rod and end portion. This threaded engagement may be referred to as a primary retention means for connecting the threaded rod 160 to the end portion 92. In this example there is also provided a layering of adhesive 165 in this example Loctite ® 243 along at least a portion of said threading disposed within the bore. The adhesive functions as a backup or secondary retention means for connecting the threaded rod 160 to the end portion 92. Any suitable adhesive may be used. The threaded rod 160 extends towards a second end 164 opposite first end 162.

Figures 9, 10, 11, 12, 13:
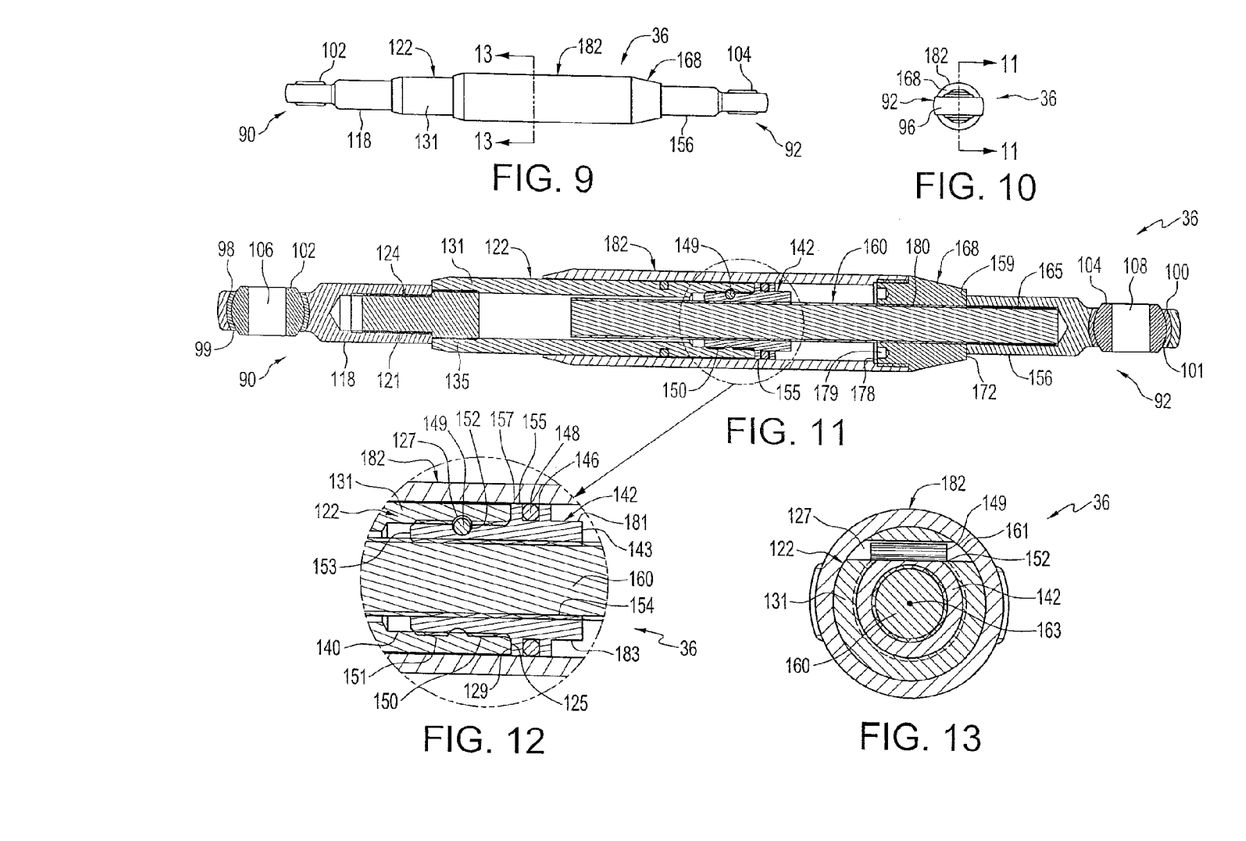
FIG. 9 is a top plan view of the tie bar shown in FIG. 7, the tie bar being in an intermediate position.
FIG. 10 is an end elevation view of the tie bar shown in FIG. 9.
FIG. 11 is a sectional view of the tie bar shown in FIG. 10 taken along the lines 11-11 of FIG. 10, showing a male-female connector.
FIG. 12 is a magnified sectional view of the tie bar shown in FIG. 11, showing the male-female connector shown in greater detail.
FIG. 13 is a sectional view of the tie bar shown in FIG. 9 taken along the lines 13-13 of FIG. 9.

Jam nut 168 has a first end 172 disposed to abut end 159 of end portion 92 and a second end 178 spaced-apart from the first end 172. As shown in FIG. 11, the jam nut 168 in this example has a plurality of pin holes in this example four spaced-apart pin holes 179 that extend inwards from the second end 178 towards the first end 172 and which are for applying torque to the jam nut. The jam nut includes a threaded interior aperture 180 that extends through the jam nut from the first end 172 to the second end 178. Aperture 180 is shaped to receive and in this example threadably engage with threaded rod 160. This threaded connection may be achieved by engaging the pin holes 179 and applying torque to the jam nut 168 thereby until end 172 abuts end 159 of elongate portion 156. Jam nut 168 in this example includes a tapered wall 170 that extends outwards from the threaded rod 160, as the jam nut extends away from end portion 92 and towards second end 178 of the jam nut. Tapered wall 170 provides a smooth transition between elongate portion 156 and outer tube 182.

Jam nut 168 has a threaded outer wall 174 in this example extending from the second end 178 and at least partially towards first end 172. Outer wall 174 is slightly inset relative to where it is adjacent to tapered wall 170. An annular shoulder 176 extends radially outwards from outer wall 174 to tapered wall 170.

Outer tube 182 has a first end 184, a second end 186 opposite the first end and a cylindrical-shaped interior 188 extending from the first end to the second end. The tube includes at the first end 184 an interior threaded surface 175. Surface 175 faces interior 188 and threadably engages with outer wall 174 of the jam nut 168. Outer tube 182 includes a tapered wall 187 by its second end 186 that extends outwards from the second end 186 and at least partially towards the first end 184. Threaded rod 160 is fully disposed within the interior 188 of the tube 182 and extends in this example parallel to the tube 182.

Referring back to FIG. 6, the tie bar's second subassembly 116 comprises end portion 90, connecting member 124, and a second tube in this example an inner tube 122, Inner tube 122 includes a first part in this example tubing 131 and a second part, in this example, a further or second threaded member, namely, a male-female connector 142.

End portion 90 is substantially the same as end portion 92 and as shown in FIG. 8, includes a circular protrusion portion 94, a spherical-like recess 98 within which a ball 102 is disposed, and a bushing 99 interposed between the ball 102 and recess 98. Ball 102 has a recess 106 shaped to receive the bolt 82 shown in FIG. 5. End portion 90 has an elongate portion 118 connected to and extending from circular protrusion portion 94 towards an end 103 of the elongate portion 118, and a threaded bore 120 extending from end 103 to the left, from the perspective of FIG. 8.

Connecting member 124 has a first cylindrical portion in 126 which in this example is threaded. Portion 126 is shaped to be disposable within, threadably engageable with and fixedly connected to threaded bore 120. This connection is achieved by applying torque to one or both of the connecting member 124 and end portion 90. This threaded engagement may be referred to as a primary retention means for connecting the connecting member 124 to the end portion 90. In this example there is also provided a layering of adhesive 121 in this example Loctite ® 243 along at least a portion of said threading disposed within the bore. Other adhesives may also be used. The adhesive functions as a backup or secondary retention means for connecting the connecting member 124 to the end portion 90.

Connection member 124 includes a second cylindrical portion 128 connected to the first cylindrical portion 126. In this example the second cylindrical portion 128 is also threaded and has a larger diameter relative to the first cylindrical portion 126. An annular shoulder 130 connects to portion 126 and extends radially outwards therefrom to portion 128.

Tubing 131 has a first end 123, a second end 125 opposite the first end, and an interior 137 that includes a bore 134 extending from first end 123 towards second end 125 and in this example a further bore 140 extending from second end 125 towards the first end 123. Tubing 131 at its first end 123 includes an interior surface 136 that is threaded in this example. Tubing 131 via its interior surface 136 threadably engages with and is fixedly connected to second cylindrical portion 128 of the connecting member 124. This threaded connection may for example be achieved by applying torque to one or both of the end portion 90 and the tubing 131. The threaded engagement may be referred to as a primary retention means. With the connecting member 124 so disposed, end 123 of tubing 131 is abutable with end 103 of end portion 90. In this example there is also provided a layering of adhesive 135 in this example Loctite ® 243 along at least a portion of the threading and this acts as a backup or secondary retention means for connecting the connecting member 124 to the tubing 131. Other adhesives may also be used.

Tubing 131 in this example includes a tapered wall 132 connected to the first end 123 and that extends outwardly therefrom towards the right, from the perspective of FIG. 8, away from end portion 90. Tapered wall 132 provides a smooth transition between elongate portion 118 and outer wall 133 of tubing 131. Inner tube 122 with its tubing 131 is shaped so as to be disposable within outer tube 182. Tapered wall 187 of outer tube 182 provides a smooth transition between outer wall 133 of tubing 131 and outer wall 185 of outer tube 182.

Tubing 131 has an annular groove 138 interposed between ends 123 and 125 and an annular seal in this example an o-ring 139 disposed within the groove.

Referring to FIG. 12, tubing 131 has a transversely extending passageway 127 located adjacent to the second end 125. Passageway 127 extends through and is in communication with bore 140. Passageway 127 is axially offset relative to central axis 163 of tube 122 as shown in FIG. 13.

The second part of the inner tube 122, namely, male-female connector 142 is also best shown in FIG. 12 and includes a first end 153, a second end 143 opposite the first end 153 and a threaded interior bore 154 extending from the first end to the second end. Threaded bore 154 is shaped to receive and threadably engage with threaded rod 160. Connector 142 includes a first portion 150 for connecting with tubing 131 that extends from first end 153 towards second end 143. First portion 150 is so shaped as to fit within bore 140 of tubing 131. In this example first portion 150 includes an outer wall 151 that is threaded for threadably engaging with the threading of the bore 140. The threaded engagement may be referred to as a primary retention means for the inner tube 122 by connecting tubing 131 and connector 142 together.

Connector 142 includes a second portion 155 shaped to be slidably disposable within outer tube 182 and that extends from second end 143 towards first end 153. An annular shoulder 129 extends radially outwards from outer wall 151 of portion 150 to outer wall 157 of second portion 155. Second portion 155 includes an annular groove 146 that extends radially inwards towards bore 154 and that is disposed between shoulder 129 and end 143. Groove 146 is shaped to receive an annular seal in this example o-ring 148, which in turn is disposed to slidably, sealably abut with outer tube 182. Second portion 155 includes a pair of spaced-apart, axially offset, transversely extending, L-shaped and elongate grooves 181 and 183 that extend from second end 143 towards first end 153. End 143 with its grooves 181 and 183 may be said to form an at least partially rectangular protrusion, best shown in FIG. 6, which may be gripped by a wrench or the like.

Connector 142 further includes an annular groove 152 located on the first portion 150 between end 153 and shoulder 129. When connector 142 is fully threadably inserted within tubing 131 such that end 125 of tubing 131 and shoulder 129 of the connector abut, groove 152 aligns with passageway 127. As shown in FIGS. 6, 12 and 13, a retention pin 149 is insertable through opening 161 of tubing 131, into passageway 127 and partially within groove 152. Pin 149 so positioned thus inhibits connector 142 from rotating relative to tubing 131 and thereby acts to secure the connector in place. Pin 149 thus functions as a secondary retaining means for the inner tube 122 by connecting tubing 131 and connector 142 together.

Figure 14:
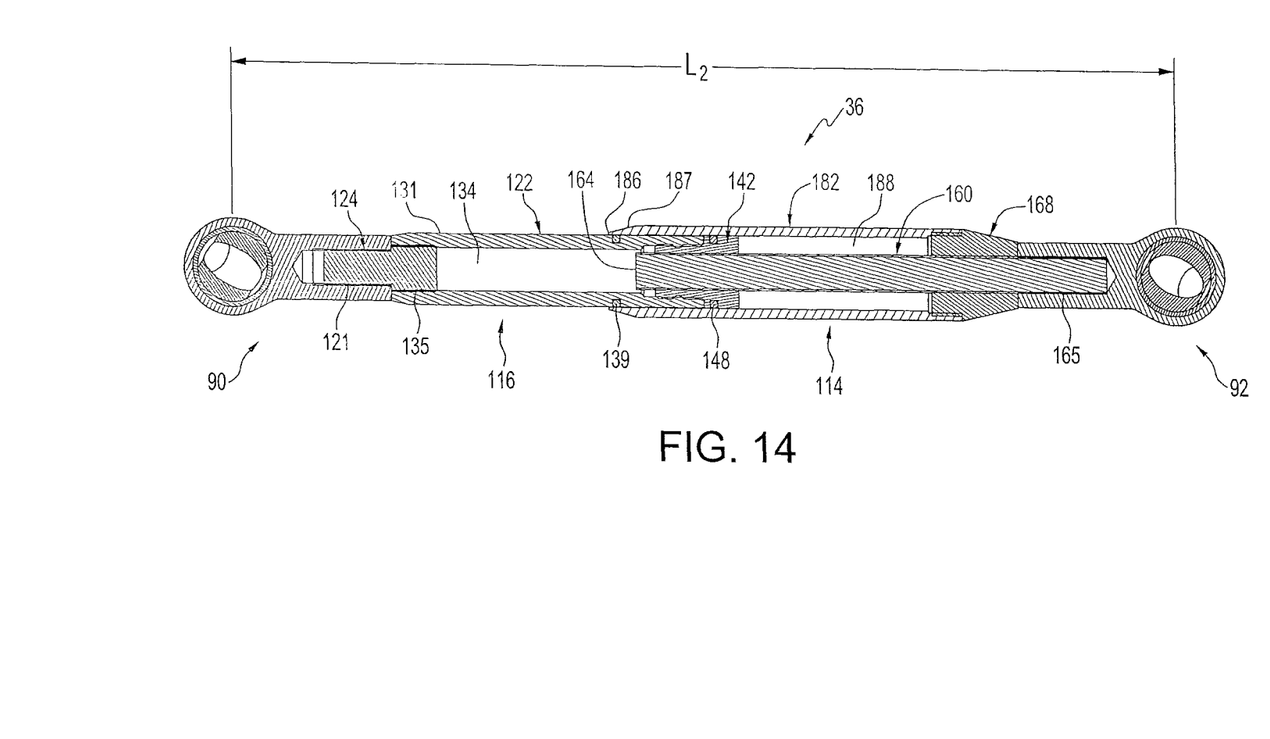
FIG. 14 is a side elevation, sectional view of the tie bar shown in FIG. 7 with the tie bar being in a fully extended position.

In operation and referring to FIGS. 8 and 14, tie bar 36 is selectively length adjustable from the fully retracted mode shown in FIG. 8 to the fully extended mode shown in FIG. 14. To extend the length of the tie bar 36 one of end portions 90 and 92 may be rotated while keeping the other of the end portions fixed. This will cause threaded rod 160 to threadably engage with bore 154 of connector 142, moving the threaded rod (and the first subassembly 114) to the right relative to FIG. 8 and/or moving connector 142 (and the second subassembly 116) to the left relative to FIG. 8. Put another way, when a user rotates one of the tube assemblies 114 and 116 relative to the other of the tube assemblies 114 and 116, depending on which way one rotates, this will act to either reduce or increase the center to center distance of the assemblies, or put another way, the tie rod end to end distance. The tie bar's length may vary from length $L_1$ extending between the centers of the balls 102 and 104 in the fully retracted position of FIG. 8, to the relatively larger length $L_2$ extending between the centers of the balls 102 and 104 in the fully extended position of FIG. 14.

Tubes 122 and 182 are thus telescoping and the tie bar is thus so configured with its tubes 122 and 182 to encase and protect the threading mechanism comprising the threaded rod 160 and connector 142. This protection of the threading mechanism is enhanced by sealing provided by o-rings 139 and 148 disposed between the first and second subassemblies and which allow the tubes 122 and 182 to sealably engage within each other. The tie bar as herein disclosed with its tube encasing together with its pair of spaced-apart seals thus provides a structure that is relatively comprehensive in protecting against water, debris, and the like entering within interior 188 and thereby causing damage or rust to the interior components. The tie bar may thus be relatively more robust, waterproof and long-lasting.

O-rings 139 and 148 provide the further function of acting as dampers to prevent the various parts of the tie bar from vibrating due to vibrations from the vessel and engines. O-rings 139 and 148 thus thereby act to further slow down wear and tear that would otherwise occur through fatigue stress and the like. O-rings 139 and 148, so disposed may also give the tie bar an aesthetically pleasing tight feel.

O-ring 139 provides the yet further function of acting an indicator of the limit past which the tie bar should be not extended any further. This is best shown in FIG. 14: tie bar 36 may be extended by the user up until the point where end 186 of the outer tube 182 and o-ring 139 meet and align. While further extension may be possible the visible presence of o-ring 139 acts as a visual cue to the user that the tie bar is at its recommended extension limit and should not be extended further.

It will be appreciated that many variations are possible within the scope of the invention described herein. For example, end portion 90, connecting member 124, and inner tube 122 may in the alternative comprise a single part. In a further alternative, connecting member 124 may not be required with, for example, end portion 90 and inner tube 122 connecting together directly and/or comprising a single part.

End portion 92, jam nut 168 and outer tube 182 may also or alternatively comprise a single part. Alternatively jam nut 168 is not needed, as end portion 92 and outer tube 182 may connect together directly and/or comprise a single part.

There are many other ways of creating fixed connections between end portion 90, connecting member 124 and inner tube 122, and between end portion 92 and threaded rod 160, as would be appreciated by one skilled in the art. For example, instead of threaded engagement, one could configure the parts for press-fit connection. One could alternatively provide cross-pins for connecting the parts. To any of the above variations one could further provide an adhesive such as Loctite ® 243 or any other suitable adhesive for a secondary retention means. However, adhesives per se are not required for any of the fixed connections.

Annular grooves 138 and 146 are disposed on the inner tube 122 in the embodiments described in FIGS. 1 to 15. However in the alternative the outer tube 184 may have annular grooves facing the interior 188 and within which o-rings may be disposed. While two o-rings 139 and 148 have been disclosed, the tie bar in the alternative and in a less preferred mode may be configured with only one or none of the o-rings 139 and 148.

Figure 15:
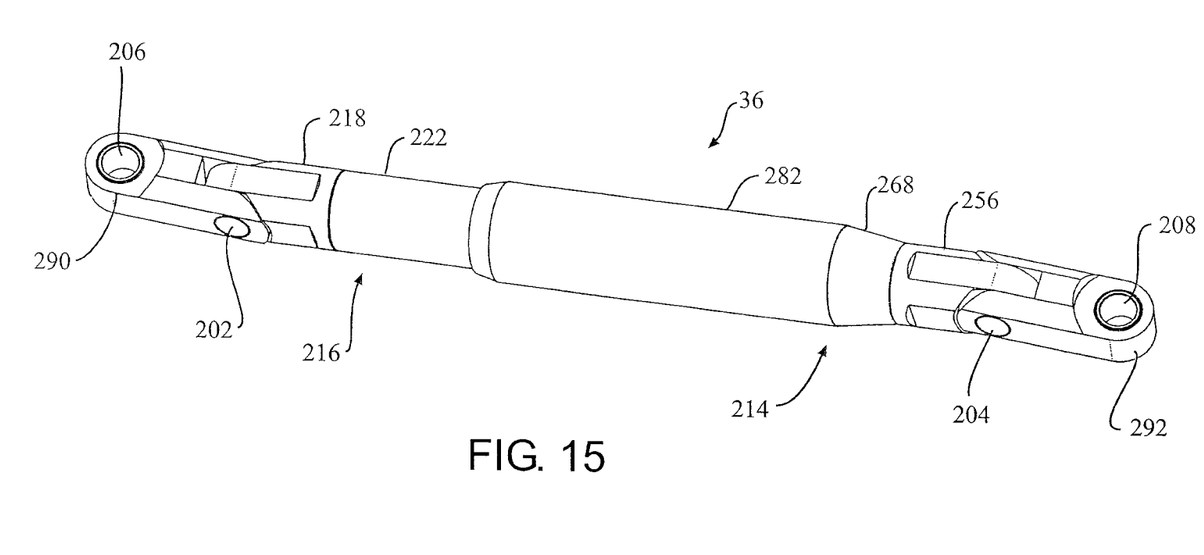
FIG. 15 is a perspective view of a tie bar in accordance with another embodiment of the invention.

Another embodiment similar to that described above is shown in FIG. 15. FIG. 15 has several of the features shown and described in the previous embodiment. (For example FIG. 7). The second embodiment will not be shown in cross section as the internal workings of the tie bar 236 are similar to that shown in the embodiment described in FIGS. 1-14. However the end portions 290 and 292 are slightly different in the embodiments as shown described in FIGS. 1-14 and will be described in additional detail below.

As shown in FIG. 15, tie bar 236 includes a first assembly 214 and a second assembly 216. The first assembly 214 includes a jam nut 268 and an elongate portion 256. The elongate portion 256 is pivotally attached to the end portion 292 with a hinge or pivot pin 204. End portion 292 has a recess 208 that serves a similar function as the recess 108 that is shown and described in the embodiments of FIGS. 1-14.

The second subassembly 216 contains an inner tube 222 connected to an elongate portion 218. End portion 290 is connected to the elongate portion 218 via a hinge or pivot pin 202. The two end portions 290 and 292 can therefore pivot or move with respect to the elongate portions 218 and 256. The end portion 290 also includes a recess 206 which performs a similar function as the recess 106 shown and described above. The inner tube 222 telescopes within the outer tube 282 in a manner shown and described above with respect to embodiments of FIGS. 1-14.

It will be understood by someone skilled in the art that many of the details provided above are by way of example only and are not intended to limit the scope of the invention which is to be determined with reference to the following claims.

What is claimed is:

1. A tie bar comprising:
   a first subassembly having an end portion connectable to a marine propulsion unit, an outer tube operatively extending from the end portion and a first threaded member connected to the end portion and disposed within and at least partially extending along the outer tube; and
   a second subassembly having an end portion connectable to a further marine propulsion unit, an inner tube extending from the end portion of the second subassembly, the inner tube comprising tubing having a bore, and the inner tube comprising a second threaded member, the second threaded member having a first portion shaped to fit within and
   engage with portions of the tubing surrounding the bore of the tubing, having a second portion slidably disposable within and sealable with the outer tube, and having a threaded interior bore threadably engaging with the first threaded member, the distance of separation between the end portions being selectively adjustable thereby.

2. The combination as claimed in claim 1, wherein ball joints connect the end portions of the tie bar to the marine propulsion units.

3. The combination as claimed in claim a 1, wherein double pinned joints connect the end portions of the tie bar to the marine propulsion units.

4. The tie bar as claimed in claim 1, wherein the second threaded member is a male-female connector connected to one end of the tubing.

5. The tie bar as claimed in claim 1, wherein the first portion and the second portion of the second threaded member have outer walls, an annular shoulder extends radially outwards from the outer wall of the first portion of the second threaded member to the outer wall of the second portion of the second threaded member, the shoulder being shaped to abut an inner end of the tubing.

6. The tie bar as claimed in claim 1, wherein the second portion of the second threaded member has an annular groove and wherein a first annular seal is disposed within the groove, the seal slidably and sealably abutting with the outer tube.

7. The tie bar as claimed in claim 1, wherein the second threaded member has an annular groove and wherein a first annular seal is disposed within the groove, the seal being positioned to slidably and sealably abut with the outer tube.

8. The tie bar as claimed in claim 1, wherein the second threaded member has a first end disposed within the tubing, a second end spaced-apart from the tubing, and a pair of spaced-apart, axially offset, transversely extending, elongate grooves that extend from the second end of the second threaded member towards the first end of the second threaded member, said grooves forming a protrusion that may be gripped for threadably securing the second threaded member within the tubing.

9. The tie bar as claimed in claim 1, wherein the tubing has a transversely extending passageway, wherein the first portion of the second threaded member has an annular groove, said annular groove aligning with the passageway of the tubing when the first portion of the second threaded member is disposed within the tubing, and wherein the tie bar further includes a retaining pin insertable through the passageway and insertable partially through the annular groove, the retaining pin being so positioned to inhibit the second threaded member from rotating relative to the tubing and acting to secure the second threaded member in place.

10. The tie bar as claimed in claim 7 wherein the outer tube and the inner tube are telescoping, with the outer tube shaped to receive the inner tube, wherein the first threaded member is a threaded rod, and wherein the tie bar further includes a second annular seal disposed at least partially interposed between the outer tube and the tubing.

11. The tie bar as claimed in claim 10 wherein the seals are positioned to both inhibit water from contacting the first threaded member and act as dampeners, reducing vibrating of the tie bar arising from vibrations of the marine propulsion units.

12. The tie bar as claimed in claim 1 further including an annular seal disposed at least partially interposed between the outer tube and the tubing, and wherein the tie bar may range from a fully retracted position to a fully extended position and wherein the seal is so disposed as to remain hidden by the outer tube when the tie bar is in a position ranging anywhere from the fully retracted position to less than the fully extended position and is exposed relative to the outer tube when the tie bar is in the fully extended position, the seal indicating when the tie bar is in the fully extend position thereby.

13. The tie bar as claimed in claim 1 wherein the end portion of the first subassembly includes a bore, the first threaded member is partially disposed within the bore and fixedly connects to the end portion, and the first subassembly further includes a jam nut having a threaded interior bore that threadably connects to the first threaded member, the jam nut being disposed to abut the end portion of the first subassembly, and the jam nut further including a threaded outer wall that threadably connects with the outer tube.

14. The tie bar as claimed in claim 13 wherein the end portion of the first subassembly fixedly connects to the first threaded member via an adhesive.

15. The tie bar as claimed in claim 13 wherein the end portion of the second subassembly includes a bore, and the second subassembly further includes a connector member disposed in part within and fixedly connected to the bore of the end portion of the second subassembly and disposed in part within and being fixedly connected to the tubing, and wherein the connector member fixedly connects to the end portion of the second subassembly via an adhesive and fixedly connects to the tubing via an adhesive.

16. The tie bar of claim 1, wherein the first end portion is pivotally connected to the outer tube and the second end portion is pivotally connected to the tubing.

17. The tie bar of claim 1, wherein the first end portion is threaded to the outer tube and the second end portion is threaded to the tubing.

18. In combination, a first marine propulsion unit, a second marine propulsion unit and a tie bar, the tie bar comprising:
   a first subassembly having an end portion connected to the first marine propulsion unit, an outer tube operatively extending from the end portion and a first threaded member connected to the end portion and disposed within and at least partially extending along the outer tube; and
   a second subassembly having an end portion connectable to a further marine propulsion unit, an inner tube extending from the end portion of the second subassembly, the inner tube comprising tubing having a bore, and the inner tube comprising a second threaded member, the second threaded member having a first portion shaped to fit within and engage with portions of the tubing surrounding the bore of the tubing, having a second portion slidably disposable within and sealable with the outer tube, and having a threaded interior bore threadably engaging with the first threaded member, the distance of separation between the end portions being selectively adjustable thereby.

19. The combination as claimed in claim 18 wherein the marine propulsion units are outboard engines.

* * * * *

UNITED STATES PATENT AND TRADEMARK OFFICE
CERTIFICATE OF CORRECTION

PATENT NO. : 8,425,270 B2  
APPLICATION NO. : 13/008683  
DATED : April 23, 2013  
INVENTOR(S) : Brian James Dudra et al.

Page 1 of 1

It is certified that error appears in the above-identified patent and that said Letters Patent is hereby corrected as shown below:

In the Claims

Column 9 lines 27-29 should read

3. The combination as claimed in claim 1, wherein double pinned joints connect the end portions of the tie bar to the marine propulsion units.

Column 10 lines 1-6 should read

10. The tie bar as claimed in claim 7 wherein the outer tube and the inner tube are telescoping, with the outer tube shaped to receive the inner tube, wherein the first threaded member is a threaded rod, and wherein the tie bar further includes a second annular seat disposed and at least partially interposed between the outer tube and the tubing.

Column 10 lines 12-21 should read

12. The tie bar as claimed in claim 1 further including an annular seal disposed and at least partially interposed between the outer tube and the tubing, and wherein the tie bar may range from a fully retracted position to a fully extended position and wherein the seal is so disposed as to remain hidden by the outer tube when the tie bar is in a position ranging anywhere from the fully retracted position to less than the fully extended position and is exposed relative to the outer tube when the tie bar is in the fully extended position, the seal indicating when the tie bar is in the fully extend position thereby.

Signed and Sealed this  
Sixth Day of August, 2013

Teresa Stanek Rea  
*Acting Director of the United States Patent and Trademark Office*